UNITED STATES PATENT OFFICE.

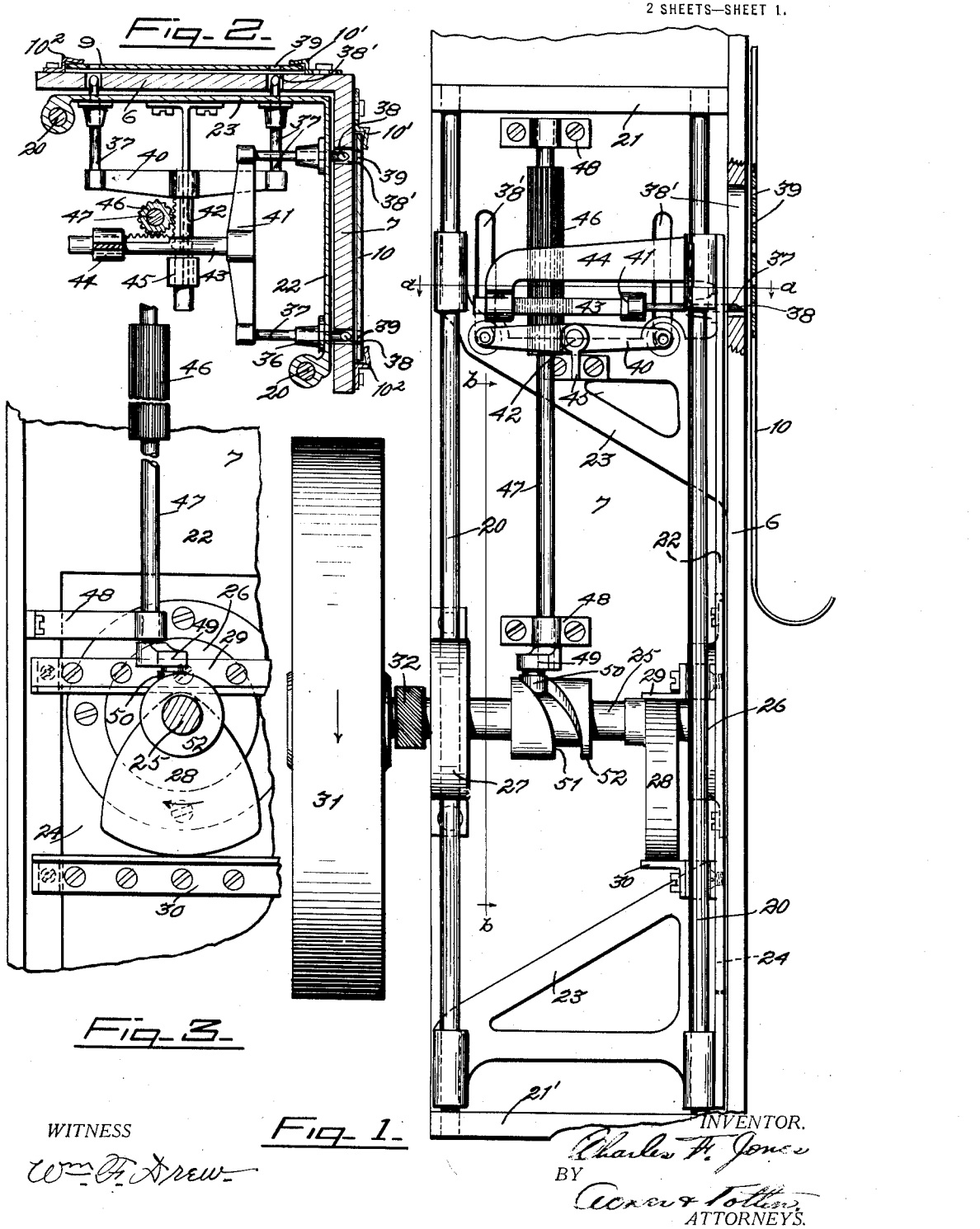

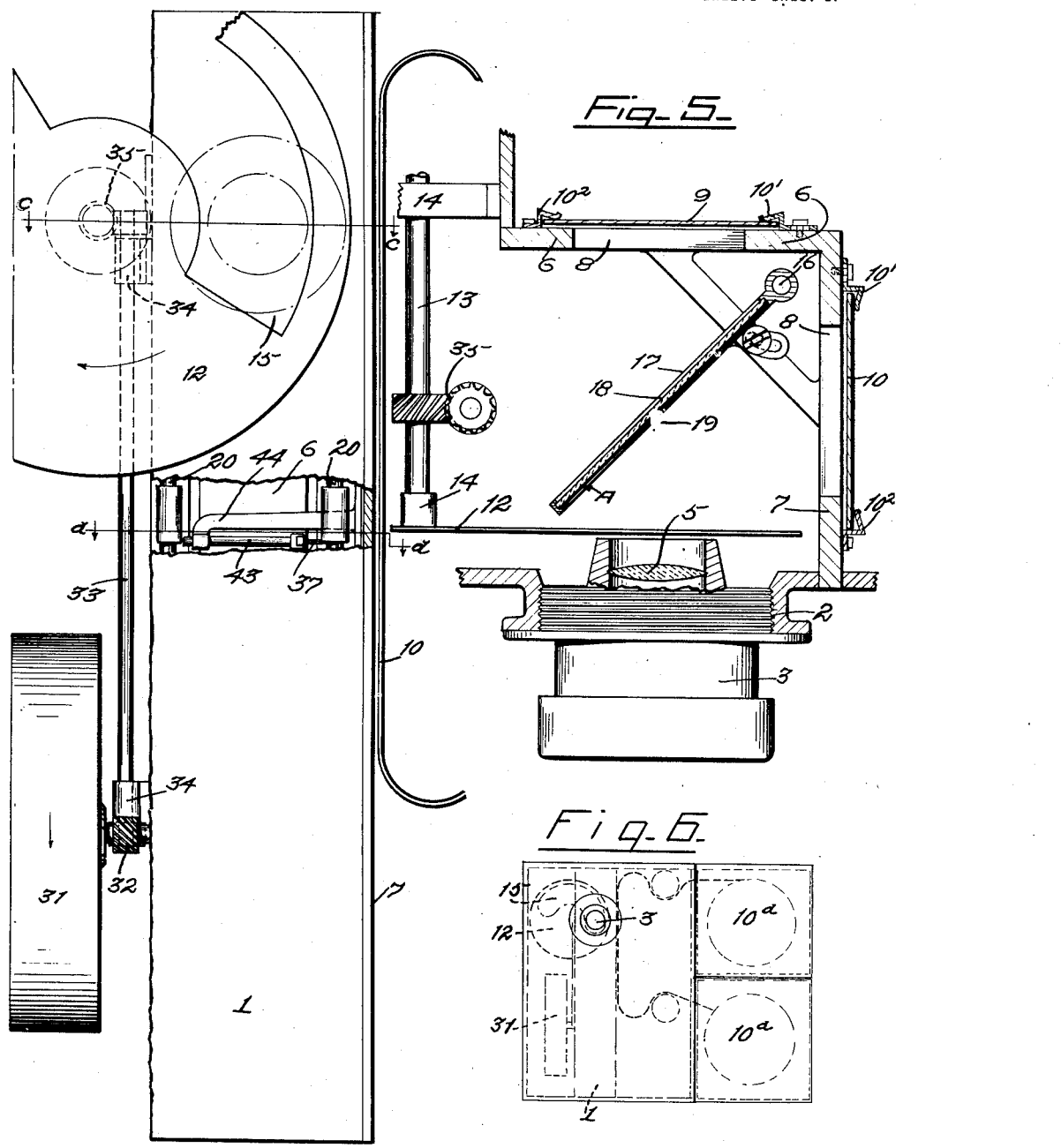

CHARLES F. JONES, OF LOS ANGELES, CALIFORNIA, ASSIGNOR TO COLORCO, OF SAN FRANCISCO, CALIFORNIA, A CORPORATION OF CALIFORNIA.

DUPLEX CAMERA.

1,416,645. Specification of Letters Patent. Patented May 16, 1922.

Application filed March 13, 1916, Serial No. 83,791. Renewed December 15, 1919. Serial No. 345,125.

*To all whom it may concern:*

Be it known that I, CHARLES F. JONES, a citizen of the United States, residing at the city of Los Angeles, county of Los Angeles, and State of California, have invented certain new and useful Improvements in Duplex Cameras, of which the following is a specification.

The present invention relates to improvements in cameras and more particularly to that type commonly termed duplex cameras, and the invention has for its principal objects to provide a camera of this type whereby at a single exposure a plurality of negatives taken from the same point of view and adapted to register when in superimposed relation may be obtained; to provide a camera of this type adapted for use with the well known sensitized film in the making of negatives and wherein there is provided an improved mechanism for intermittently moving the film, enabling duplicate registery negatives of what are commonly termed motion pictures to be simultaneously taken from the same point of view.

The invention consists in providing a means within the camera and so disposed as to permit the image received by the lens to be transmitted to a plurality of sensitized surfaces or films and to provide means operated simultaneously with the shutter for intermittently and simultaneously moving both of said sensitized surfaces or films to successively present unexposed portions of the film in the path of the light rays passing through the lens.

With the above mentioned and other objects in view, the invention consists in the novel construction and combination of parts hereinafter described, illustrated in the accompanying drawings and set forth in the claims hereto appended; it being understood that various changes in the proportion, form, size and minor details of construction within the scope of the claims may be resorted to without departing from the spirit or sacrificing any of the advantages of the invention.

To more fully comprehend the invention, reference is directed to the accompanying drawings, wherein—

Fig. 1 is a vertical sectional view of a camera box equipped with an embodiment of my invention, disclosing the reciprocating pin or claw carrying carriage, the reciprocating pin or claw carrying frames, a portion of one of the films, and means for operating the pin or claw carrying carriages and pin frames.

Fig. 2 is a transverse sectional view taken on lines $a$—$a$ of Figs. 1 and 4, disclosing the arrangement of the pin or claw carrying frames, the supporting carriage therefor, and a film for engagement by each of said sets of pins.

Fig. 3 is a vertical sectional view taken on line $b$—$b$ of Fig. 1.

Fig. 4 is a view in front elevation, disclosing the shutter and operating means therefor.

Fig. 5 is a transverse sectional view, taken on the line $c$—$c$ of Fig. 4, disclosing more fully the preferred arrangement of the films and the platenized surface mirror in rear of the lens.

Fig. 6 is a view in front elevation of a camera box, disclosing the general arrangement of the preferred embodiment of my invention when positioned therein.

Referring more particularly to the several views of the drawings, wherein like characters of reference designate corresponding parts,—1 indicates a suitable camera box or casing preferably of any well known shape, and the same is provided with a suitable opening 2 in which is positioned any of the well known lens mountings 3 provided with one or more lenses 5. The interior of the camera box or casing is provided with the vertically disposed dividing walls 6 and 7, one preferably arranged in rear of said lens and in a plane parallel therewith, and the other preferably to one side of said lens opening and at right angles to said wall 6. Each of said walls is provided with an aperture or opening 8, over each of which is adapted to be positioned suitable sensitized surfaces or films 9 and 10, which are supported at their opposite ends on reels $10^a$, Fig. 6, and which simultaneously receive the image transmitted by the lens 5 when the shutter controlling the passage of the light therethrough is in open position. The film or other sensitized surface 9 and 10 in its movement passes between the guides 10' and $10^2$, positioned one on each side of the openings 8, the guides 10' preferably being adjustable to maintain the adjacent edges of the film surfaces 9 and 10 in their proper position relative to the lens and semi-transparent reflector to obtain impressions which will register if the corresponding images on the different film surfaces are positioned in superimposed relation.

The shutter 12 is carried by a rotating shaft 13 mounted in bearings 14 and is provided with a suitable arcuate slot or opening 15 for registry with the lens 5 to permit the image to pass therethrough and be received on the sensitized surfaces or films 9 and 10. Pivotally supported at the juncture of the walls 6 and 7, as at 16, is a vertically disposed adjustable frame 17, in which is positioned a semitransparent body 18 preferably having a platenized surface 19 providing a mirror to transmit one-half of the light passing through the lens onto the film 9, and to reflect the other half onto film 10, enabling two images on different sensitized surfaces to be obtained simultaneously from the same point of view. The apertures 8, lens 5 and surface 19 of the mirror 18 are arranged so that the axis of the lens and apertures intersect on the platenized surface 19 of the mirror 18, this being accomplished by positioning the mirror at an angle of 45 degrees to the films or sensitized surfaces 9 and 10, as in Fig. 5.

To intermittently and simultaneously move the film over the apertures 8 while the shutter 12 is in closed position, I employ any well known mechanism, but preferably of the following construction.

Adjacent to the outer edges of the walls 6 and 7 are suitable vertically disposed guides 20 secured at their upper ends in the transverse partition 21 connecting the walls 6 and 7 below the lens 5 and the lower ends thereof are secured in the bottom wall 21′ of the camera casing or box 1. Slidably mounted on said guides is a suitable reciprocating pin or claw carrying carriage, comprising the side wall 22 provided at one edge with the brackets 23 disposed at right angles thereto, said side wall and brackets are adapted to lie one adjacent and in slight spaced relation to the inner surfaces of the respective dividing walls 6 and 7.

The wall 22 of the carriage is provided with a suitable vertically disposed slot or opening 24 through which projects one end of a shaft 25 mounted at its opposite ends in bearings 26 and 27, one secured to the wall 7, and the other carried by the wall 6, and through which one of the guides 20 passes. The shaft 25 carries a carriage reciprocating cam 28 which cooperates with the horizontally disposed flanges or surfaces 29 and 30, carried by the wall 22 of the carriage adjacent the upper and lower edges of the slot or opening 24 therein. A balance or fly wheel 31 is carried by one end of the shaft 25, and said shaft is also provided with a suitable gear 32 which has gear connection with a power transmitting shaft 33 mounted in bearings 34 and which in turn has geared connection, as at 35, with the shutter supporting shaft 13. The gear ratio between the shaft 25 and the shutter carrying shaft 12 is such that the opening 15 of the shutter 12 is in register with the lens during the period of travel of the apex of the cam 28 over its contact point with the flanges 29 and 30, and during the upward movement of the carriage. The upper portion of the side wall 22 and upper bracket 23 are each provided with a pair of apertures arranged in a horizontal plane and the pair in the bracket 23 are slighly below the pair in the side wall 22. Suitable guides 36 surround the inner edges of the apertures and in said apertures and guides are adapted to reciprocate claws or pins 37 having beveled outer ends 38 and which are adapted to project through vertical openings or slots 38′ in the dividing walls 6 and 7 and on the downward movement of the carriage to extend through the perforations 39 in the sensitized film 9 and 10 and move or draw the same downwardly the distance of the movement of the carriage. The respective pairs of pins or claws 37 are carried by the connecting members 40 and 41 from the rear of which extend the respective toothed spindles 42 and 43 which cross each other at right angles—Figs. 1 and 2, and are supported at the rear ends in guides 44 and 45 in which they reciprocate, said guides being in turn carried respectively by the plate 22 and bracket 23. The connecting members and spindles provide a frame for supporting and mounting the respective pairs of claws or pins.

A suitable elongated toothed gear 46 cooperates with the toothed spindles 42 and 43, and said gear is carried by a shaft 47 rotatably mounted in bearings 48 carried by the wall 6. The shaft 47 carries at its lower end a crank arm 49 and said arm is provided with a suitable crank pin 50 which projects into and operates in a cam groove 51 in the member 52 secured to rotate with the shaft 25. The rotation of the shaft 25 oscillates the shaft 47, which in turn causes the pins or claws 37 to reciprocate in the guides 36 and the elongated gear 46 insures the engagement of the gear with the spindles 42 and 43 during the reciprocation of the carriage.

The configuration of the cam groove 51 is such as to only project the pins or claws outwardly through the perforations in the film when the carriage is in its uppermost position, and to retain the same in their outermost position during the downward movement of the carriage, to engage the film and move the same over the walls 6 and 7 to successively present an unexposed portion to the openings 8 and to receive the image on the registering of the shutter opening 15 with the lens.

I have provided a camera which will enable the taking of a plurality of negatives simultaneously from the same point of view and by a single operation of the shutter, and one wherein there is incorporated a means for intermittently moving the several films while the shutter is closed to present an unexposed portion thereof to the path of light passing through the lens when the shutter is again opened.

Having thus described my invention, what I claim as new and desire to protect by Letters Patent is:—

1. In a camera provided with a lens and shutter, a plurality of apertured walls therein one arranged transversely to said lens opening and the other parallel therewith in advance of said first wall and at substantially right angles thereto, said camera adapted for receiving a plurality of films one for movement over each of said walls for the simultaneous exposure of successive portions thereof to the light rays passing through said lens, a vertically reciprocating carriage, a pair of horizontally reciprocating claw carrying frames carried thereby and arranged at approximately right angles to each other for cooperating with the respective films, and means for operating said shutter and for reciprocating said carriage and said frames.

2. A camera provided with a lens and shutter and adapted for receiving separate sensitized surfaces or films passing therethrough arranged at substantially right angles to each other with their adjacent side edges in parallel relation and for the exposure of successive portions thereof to the light rays passing through said lens, apertured surfaces over which said films or surfaces operate, a vertically reciprocating carriage, a pair of horizontally reciprocating frames supported by said carriage for engaging the film, said frames being disposed in different planes, and means for operating said carriage and for reciprocating said claw carrying frames.

3. A camera provided with a lens and shutter and adapted for receiving separate sensitized surfaces or films passing therethrough arranged at substantially right angles to each other with their adjacent side edges in parallel relation and for the exposure of successive portions thereof to the light rays passing through said lens, apertured surfaces over which said films operate, a vertically reciprocating carriage, a pair of horizontally reciprocating claw frames mounted on said carriage and arranged at right angles to each other and each provided with a pair of claws for cooperating with said films, and means for operating said carriage and for reciprocating said claw-carrying frames.

4. A camera provided with a lens and adapted for the taking of duplicate sets of motion pictures for registering when placed in superimposed relation, said camera adapted for receiving separate sensitized surfaces or films passing therethrough and for the exposure of successive portions thereof to the light rays passing through said lens, a vertically reciprocating carriage, a frame for supporting and guiding said carriage, a pair of horizontally reciprocating claw frames mounted on said carriage and arranged at an angle to each other and each provided with a pair of claws for cooperating with said frames, a toothed spindle associated with each claw frame an elongated vertically disposed toothed gear cooperating with said spindles and relatively to which the same slide in engagement on the reciprocation of said carriage, and means for oscillating said gear and for reciprocating said carriage.

5. A camera provided with a lens and adapted to receive sensitized films passing therethrough for exposure to light rays passing through the lens, and means for adjusting said films comprising a horizontally adjustable claw frame, a vertically adjustable carriage, means in said carriage for permitting a horizontal adjustment of the claw frame to contact with the film and to move said claw frame vertically upon an actuation of the carriage.

6. A camera provided with a lens and adapted to receive a film passing therethrough for exposure to the light rays passing through the lens, and means for adjusting said film including a horizontal movable claw frame, a shaft for operating said frame, a cam for actuating the shaft to shift the frame horizontally, a vertically movable carriage having guides through which portions of said claw frame are free to pass, said carriage being adapted to reciprocate the claw frame bodily upon a vertical movement thereof to move the film.

7. A camera provided with a shutter and having a lens, said camera being adapted to receive a movable film adapted to be exposed to light rays passing through the lens, and means for moving said film, comprising a horizontally adjustable element adapted when moved in one position to coact with the film, and means for moving said element into and out of engagement with the film, a vertically adjustable frame, guides carried by said frame through which said first mentioned element is free to pass, said guides being constructed to prevent a relatively vertical movement of said element and the carriage, and means for reciprocating the carriage to move the horizontal element in consonance therewith and effect a shifting of the film.

8. A camera having a shutter and a suitable lens, said camera being adapted to receive a film passing therethrough to be exposed to the light rays from the lens, means for moving said film comprising a horizontally shiftable frame having an engaging element cooperating with the film when moved in one position, and means for horizontally shifting said member comprising a vertical shaft, an elongated gear carried thereby, a rack on said member cooperating with the gear, a cam for actuating the shaft, a vertically movable carriage, guides on said carriage for supporting said horizontally movable member permitting a movement of said member at right angles to the carriage, but preventing a relatively vertical movement of said member, and means for reciprocating the carriage when the horizontal member is in an extended position for moving the film.

9. A camera comprising a casing, a plurality of flexible films therein, a part of each film being disposed at an angle with respect to the other, a light dividing part within the casing comprising a surface to divide the light rays into portions travelling in different directions, means for maintaining said portions at approximately equal intensities and delivering them to the angularly disposed film surfaces substantially without further changing their directions, and means for intermittently moving the film surfaces across the paths of light.

10. A camera comprising a casing, films disposed therein, each film having a portion disposed at an angle relative to a portion of the other film, and guides for said films assuring their movement within the camera, a light dividing member comprising a surface to reflect a portion of the light in one direction and transmit another portion in a different direction, means to maintain the two portions at approximately equal intensities and deliver them from said surface to the angularly disposed film surfaces in right angular directions, and mechanism for intermittently moving the film surfaces across the paths of light.

11. A camera of the character described having a shutter and a lens, said camera being adapted to receive a plurality of sensitized surfaces, light dividing means intermediate the lens and said sensitized surfaces for reflecting a portion of the light rays upon one surface and directing the other portion of the light rays upon the other sensitized surface thereby simultaneously producing two negatives having the subjects thereon directionally reversed, and means for intermittently moving said sensitized surfaces.

In testimony whereof I have signed my name to this specification in the presence of the subscribing witness.

CHARLES F. JONES.

Witness:
D. B. RICHARDS.